United States Patent
Blank

(10) Patent No.: US 8,173,321 B2
(45) Date of Patent: May 8, 2012

(54) SEPARATOR PLATE UNIT WITH INCLINED SEPARATING WALL HAVING AT LEAST ONE METERING POINT AND FUEL CELL HAVING SEPARATOR PLATE UNIT THEREOF

(75) Inventor: Felix Blank, Konstanz (DE)

(73) Assignee: Daimler AG, Stuttgart (DE)

( * ) Notice: Subject to any disclaimer, the term of this patent is extended or adjusted under 35 U.S.C. 154(b) by 764 days.

(21) Appl. No.: 12/303,301

(22) PCT Filed: May 4, 2007

(86) PCT No.: PCT/EP2007/003945
§ 371 (c)(1),
(2), (4) Date: Dec. 3, 2008

(87) PCT Pub. No.: WO2007/140849
PCT Pub. Date: Dec. 13, 2007

(65) Prior Publication Data
US 2009/0197134 A1    Aug. 6, 2009

(30) Foreign Application Priority Data
Jun. 8, 2006   (DE) .......................... 10 2006 027 034

(51) Int. Cl.
| | |
|---|---|
| H01M 2/38 | (2006.01) |
| H01M 2/40 | (2006.01) |
| H01M 8/24 | (2006.01) |
| H01M 8/10 | (2006.01) |
| H01M 8/04 | (2006.01) |
| H01M 4/02 | (2006.01) |
| H01M 4/36 | (2006.01) |

(52) U.S. Cl. ........ 429/457; 429/480; 429/483; 429/492; 429/514; 429/534

(58) Field of Classification Search .................. 429/457, 429/534
See application file for complete search history.

(56) References Cited

U.S. PATENT DOCUMENTS
5,538,608 A * 7/1996 Furuya .......................... 204/282
(Continued)

FOREIGN PATENT DOCUMENTS
DE        10346594 A1    5/2005
(Continued)

*Primary Examiner* — Nathan W. Ha
*Assistant Examiner* — Michael Jung
(74) *Attorney, Agent, or Firm* — Patent Central LLC; Stephan A. Pendorf

(57) ABSTRACT

The invention relates to a fuel cell having a membrane electrode arrangement (16) arranged between two separator plate units (44), a first fluid area (12) for distribution of a first fluid which is adjacent to one side of the membrane-electrode arrangement (16), a second fluid area (14) for distribution of a second fluid which is adjacent to a side of the membrane-electrode arrangement (16) opposite this side, with a separating wall (36) being arranged in at least one fluid area (12) and subdividing the fluid area (12) into at least one metering area (32) and one fluid subarea (34), with the at least one metering area (32) having a fluid connection to the adjacent fluid subarea (34) at at least one metering point (38), such that the first fluid can be metered from the metering area (32) through the metering point (38) into the adjacent fluid subarea (34). According to the invention, starting from an input point (24), at the edge, for the first fluid into the fluid area (12), a cross section of the fluid subarea (34) increases in the flow direction (40) of the first fluid towards an output port (26).

13 Claims, 2 Drawing Sheets

U.S. PATENT DOCUMENTS

| | | | |
|---|---|---|---|
| 6,296,964 B1 * | 10/2001 | Ren et al. | 429/431 |
| 6,365,293 B1 * | 4/2002 | Isono et al. | 429/434 |
| 7,056,608 B2 * | 6/2006 | Lloyd et al. | 429/481 |
| 7,374,838 B2 * | 5/2008 | Gallagher | 429/434 |
| 2003/0039876 A1 | 2/2003 | Knights et al. | |
| 2003/0077501 A1 * | 4/2003 | Knights et al. | 429/38 |
| 2004/0081875 A1 * | 4/2004 | Milliken et al. | 429/30 |
| 2006/0210863 A1 * | 9/2006 | Fukuda et al. | 429/38 |
| 2008/0206615 A1 * | 8/2008 | Nicotera et al. | 429/30 |

FOREIGN PATENT DOCUMENTS

| | | |
|---|---|---|
| EP | 0133515 A2 | 2/1985 |
| WO | 2004025763 A1 | 3/2004 |
| WO | 2007017115 A1 | 2/2007 |

* cited by examiner

SEPARATOR PLATE UNIT WITH INCLINED SEPARATING WALL HAVING AT LEAST ONE METERING POINT AND FUEL CELL HAVING SEPARATOR PLATE UNIT THEREOF

The invention relates to a fuel cell with a separator plate unit, and to a separator plate unit, as claimed in the precharacterizing clauses of the independent claims.

The basic design of a polymer electrolyte membrane fuel cell (PEM fuel cell) is known. The PEM fuel cell contains a membrane electrode assembly (MEA) which is formed from an anode, a cathode and a polymer electrolyte membrane (PEM) arranged between them. The MEA itself is in turn arranged between two separator plate units, wherein a separator plate unit which is arranged above the anode has channels for the distribution of fuel, for example hydrogen gas, a hydrogen-rich reformat gas or the like, and a separator plate unit which is arranged above the cathode has channels for the distribution of oxidant, for example air, wherein these channels face the MEA. In the following text, channels such as these are also referred to as distribution channels. The distribution channels form the so-called anode area and cathode area. The electrodes, the anode and the cathode, are in general in the form of so-called gas diffusion electrodes (GDE). These have the function of carrying away the electric current which is produced in the electrochemical fuel-cell reaction (for example $2 H_2 + O_2 \rightarrow 2 H_2O$) and of allowing the reaction substances (in the end hydrogen and oxygen), educts and products, to diffuse through. In general, a GDE comprises at least one gas diffusion layer (GDL) and a catalyst layer, which faces the PEM and on which the fuel cell reaction takes place.

A fuel cell such as this can produce electric current with high power at relatively low operating temperatures. Actual fuel cells are generally stacked to form so-called fuel cell stacks, in order to achieve a high power outlet, in which case bipolar separator plates (bipolar plates) are used instead of the monopolar separator plates, and monopolar separator plates are used only as end plates for the stack. The separator plates may comprise two or more plate elements which form a unit and for this reason are referred to as separator plate units. In the following text, the expression separator plate unit is intended to mean all the above-mentioned plates and plate units. A separator plate unit can accordingly comprise a single plate or may be assembled from two or more plate elements, for example an anode plate and a cathode plate.

Certain conventional PEMs require a certain water content in order to have adequate ion conductivity. This relates in particular to PEMs which are composed of materials based on fluorinated sulfonic acids, for example Nafion. PEMs such as these are therefore generally moisturized by moisturizing the reaction substances before they are supplied to a PEM fuel cell. The disadvantage of moisturizing is the complexity associated with this and the devices which are additionally required, such as a moisturizer, which complicates the operating process and is not consistent with a fuel cell system being of a type that is as compact as possible.

A further disadvantage of moisturizing is that it is difficult to adjust a moisturization level. This is because, if moisturization is carried out to an inadequate extent or not at all and it is assumed that the product water created during the fuel cell reaction is sufficient to moisturize the PEM adequately, then this results, in particular on the cathode side, in the problem that there is a tendency to vaporization for water in the vicinity of the oxidant inlet port, because the oxidant is relatively dry there, as a result of which the PEM has a tendency to dry out, particularly in this area. If it dries out, not only can the ion conductivity then be lost, but the PEM can also be mechanically damaged, for example by cracks.

When flowing through the channels of the separator plate unit, the oxidant then absorbs product water from the MEA, as a result of which its relative humidity increases and the moisturization problem is increasingly reduced until, in the end, it disappears or, in poor circumstances, even changes over to the opposite problem, a problem of transporting water away.

The problem of transporting water away consists in that the oxidant becomes increasingly more moist as it travels further from the inlet port to the outlet port, as a result of product water absorption, and can thus absorb, and hence transport away, ever less product water, such that it is even possible for a situation to arise at the outlet port or in its vicinity in which the product water is not adequately carried away. In poor circumstances, the product water then condenses and, for example, blocks important paths for transporting the reaction substances in and out to and from the reactive centers, thus adversely affecting the fuel cell reaction, with the power of the fuel cell falling.

The problem of transporting water away can occur in particular when the oxidant is moisturized before entering a fuel cell. Although the moisturizing process means that the MEA is then sufficiently moist in the area of the oxidant inlet port, in order to prevent the PEM from drying out, the oxidant can then, however, absorb less product water from the start, as a result of which the moisture in the oxidant rapidly becomes too high in order to adequately absorb and carry away product water. The fuel cell reaction can therefore easily be adversely affected.

Thus, in general, a compromise between adequate moisturizing at the cathode inlet and adequate transportation of water away from the cathode outlet must therefore be found for conventional fuel cells with moisture-dependent PEMs.

In order to solve the moisturizing problem, DE 103 46 594 A1 describes a fuel cell which has two fluid areas, that is to say an anode area and a cathode area, in which, in one of the fluid areas, a further fluid area is separated by a separating wall and is intended to be used as a metering area for a fluid, for example oxidant. The separating wall has holes through which the metering area is fluidically connected to the cathode area, so that a fluid (the oxidant) flowing in the metering area can enter the cathode area through holes which form the metering points, and can thus be injected or metered into the cathode area. The metering area allows the supply of oxidant to the cathode area to be spatially distributed over a larger area and thus spread out. In consequence, rather than the entire volume of the oxidant that is required for the fuel cell reaction flowing via that part of the PEM which is particularly susceptible to drying out in the region of the inlet area of the cathode, the amount in the optimum case is only so much as can be electrochemically converted in this area. Since, initially, only a small amount of oxidant is metered, only a small amount of water is also required to moisturize the PEM, to be precise, in the optimum case, less than is created in this area as a result of the fuel cell reaction. Downstream, before a further metering point, the oxidant is then already partially moisturized as a consequence of the water created in the fuel cell reaction, so that the metering of dry oxidant is even less damaging than in the case of the previous metering. This trend continues further during the subsequent metering processes as a result of which, overall, scarcely any or even no moisturized oxidant can be used for the fuel cell without its PEM or its function suffering damage as a result of drying out. Thus, in the optimum case, it may even be possible to dispense with the moisturizing and water-recovery devices which have been required until now for PEM fuel cell systems, thus representing a considerable simplification of such PEM fuel cell systems.

Thus, although DE 103 46 594 A1 indicates a fundamental approach to solve the moisturizing problem, there is, however, a further need for improvement, for example in order to make it possible to exactly meter the correct amounts of oxidant at the correct point, without having to use a complex control device for this purpose.

The object of the present invention is therefore to further develop a fuel cell of the type described above such that the metering of fluid with no or little moisturization, in particular oxidant, into the relevant fluid area can be further improved with regard to the profile of the relative moisture along the fluid area, in a simple manner. A further aim is to provide a corresponding separator plate unit.

The object is achieved by the features of the independent claims. Preferred embodiments are specified in the dependent claims.

The fuel cell according to the invention has a membrane electrode assembly which is arranged between two separator plate units and, for distribution of a first fluid, a first fluid area which is adjacent to one side of the membrane electrode assembly and, for distribution of a second fluid, a second fluid area which is adjacent to a side of the membrane electrode assembly which is opposite this side, wherein a separating wall is arranged in at least one fluid area and subdivides the fluid area into at least one metering area and one fluid subarea, wherein the at least one metering area has a fluid connection to the adjacent fluid subarea at at least one metering point, such that the first fluid can be metered from the metering area through the metering point into the adjacent fluid subarea. The fuel cell is distinguished in that, starting from an edge inlet of the first fluid into the fluid area, a cross section of the fluid subarea increases in the flow direction of the first fluid towards an outlet of the fluid from the fluid area. The relative humidity, in particular the oxidant, of the fluid can thus be homogenized in a simple manner along its flow path. For the preferred case, in which the fluid area is a cathode area and the fluid is an oxidant, this results in the advantage that only a small amount of gas is available at the inlet area of the oxidant, and this amount of gas preferably increases continuously along the flow direction to the outlet from the fluid area or cathode area. This makes it possible to effectively prevent the membrane electrode assembly from drying out at the inlet area for the oxidant in the cathode area.

A cross section of the metering area can advantageously decrease in the opposite sense to the fluid subarea. This results, overall, in a separator plate unit with a uniform thickness.

The cross section of the fluid subarea can be adjusted as a function of a fluid requirement, in particular oxygen requirement, of the membrane electrode assembly and/or as a function of a desired relative humidity of the fluid in the fluid subarea, to be precise of the oxidant in the cathode subarea. The relationships are preferably chosen such that, on the one hand, sufficient oxygen for the fuel cell reaction is available on the cathode side of the membrane electrode assembly while, on the other hand, the amount of oxidant is in each case sufficiently low that a high relative humidity is created quickly by the product water. The relative humidity is expediently kept below the saturation limit in this case, at least in the area close to the metering points.

A corresponding configuration on the anode side, that is to say in the anode area of the fuel cell, is also feasible.

A simple geometry is obtained by arranging the separating wall inclined with respect to the membrane electrode assembly. The membrane electrode assembly typically has a thin shape, in the form of a plate.

The separating wall may have a plurality of holes or bores along its longitudinal extent, starting from the inlet port of the first fluid, in particular of the oxidant, through which the oxidant enters the fluid area, or cathode area, from the metering area.

The locations where the holes should advantageously be arranged along the longitudinal extent of the separating wall depends on the operating parameters (pressure, temperature, moisture, stoichiometry, etc.). It may be the case, for example, that the holes should advantageously be arranged on approximately the first third of the longitudinal extent, for certain operating parameters. In different operating conditions (high temperature, low or no moisture, lower pressure), it may be advantageous to arrange the holes along the entire longitudinal extent. However, in this case, it should be remembered that the effect of the metering at the end of the longitudinal extent is then only very minor since a large gas volume is already present. Furthermore, it is advantageous to increase the distances between the holes in the direction from the inlet port to the outlet port. This results in the distances between the holes being greater close to the outlet than close to the inlet, thus further reducing the effect of the metering at the end of the longitudinal extent.

The separating wall may be in the form of a thin foil, which is preferably metallic. The separating wall can be manufactured quickly and in large quantities and with large dimensions by means of simple stamping processes. This is particularly advantageous for large-scale production processes for motor vehicle applications in which short cycle times are normally desirable and large numbers of components must be produced.

It is particularly advantageously possible to fill the cathode subarea, close to the cathode, with a porous material for gas distribution. By way of example, the porous material may be a metal foam or a granulate or the like that is sintered together. These materials can be produced easily and, furthermore, can easily be made into the required wedge shape.

If the metering area is likewise filled with a porous material, identical parts can be used for the two areas. The wedges are simply placed on one another with their gradients in opposite directions, then resulting in the desired rectangular block. The separating wall can easily be located between them.

In this case, a metallic connection may be advantageous between the individual parts and/or a specific surface coating of the individual parts, in order to reduce the electrical contact resistances.

The porosity of the material makes it possible to dispense with complex channel structures in the separator plate units, which are otherwise required for gas transport of the fuel and of the oxidant. Channels such as these are subject to very strict manufacturing tolerances, thus meaning correspondingly expensive manufacture. Furthermore, the porous structure allows a fine distribution of the contact surfaces for the membrane electrode assembly. This has been found to be advantageous for supplying gas into the gas diffusion layer and for transporting water away from the gas diffusion layer. It may even be possible to reduce the thickness of the gas diffusion electrode. Since, in normal stacks, several hundred individual fuel cells are stacked one on top of the other, a reduction in the thickness of the individual components is highly advantageous overall for the physical size of the stack. If the gas diffusion electrode thickness is reduced, there can be made more hydrophobic than when the thickness is greater, which in turn is advantageous for an improved water hold-back capability for the membrane electrode assembly. The embodiment is particularly advantageous when a separating wall is provided in the cathode area and the anode area has no separating wall but is filled with porous material.

The separator plate unit according to the invention is distinguished in that, starting from an edge inlet port of the fluid into the fluid area, a cross section of the fluid subarea increases in the flow direction of the fluid towards an outlet port.

A cross section of the metering area advantageously decreases in the flow direction of the fluid. This results in the separator plate unit having a constant thickness.

The fluid subarea can preferably be filled with a porous electrically conductive material. This makes it possible to avoid a complex channel structure with strict tolerances. Gas distribution advantageously takes place through the porous material.

The metering area can advantageously also be filled with a porous electrically conductive material.

The fluid area is preferably a cathode area, and the fluid is an oxidant. In addition, however, the anode area can also be formed in the indicated manner. It is advantageous if the anode area is at least likewise filled with a porous electrically conductive material, which replaces the channel structures of the distribution channels, even when there is no intention of providing a separating wall in the anode area.

The subject matters according to the invention can be used industrially for example in the field of generation of electric power for traction and/or for power supply systems in vehicles.

The invention will be explained in more detail in the following text. To this end, the figures show specific exemplary embodiments of the invention in a simplified form, and these will be explained in more detail in the following description.

In the figures:

Functionally identical elements are annotated with the same reference symbols in the figures.

FIG. 1 shows a schematic illustration in the form of a section through a single fuel cell 10. A multiplicity of such fuel cells 10 are stacked one on top of the other in conventional stacks, such as those which are used for traction or for power supply in vehicles, to form a stack in the direction of the normal to the surfaces.

Figure 1:
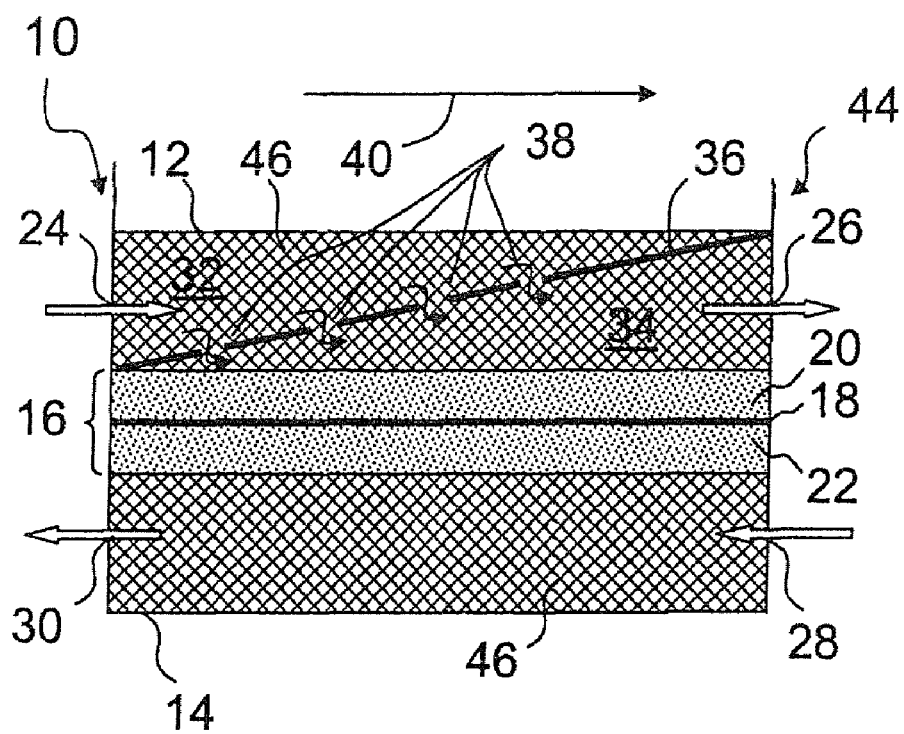
FIG. 1 shows, schematically, a single fuel cell with a membrane electrode assembly, with a gas area of a separator plate unit being adjacent to each of the two sides of the membrane electrode assembly.

The fuel cell 10 has a membrane electrode assembly 16 in which in each case one gas diffusion electrode 20, 22 is adjacent to an ion-conducting polymer membrane 18, on both sides. On the cathode side, adjacent to the membrane electrode assembly 16, a cathode area follows as the first fluid area 12, with an oxidant as the first fluid, which is supplied to the fluid area 12 via an inlet port 24, and is carried away again via an outlet port 26. An anode area is formed as the second fluid area 14 adjacent on the anode side, with a hydrogen-rich fuel as the second fluid, which is supplied via an inlet port 28 and is carried away from the fluid area 14 via an outlet port 30. The fluid areas 12, 14 are components of their respective separator plate units 44. The flow direction of the second fluid (reduction agent) is indicated by arrows to the left. The flow direction 40 of the oxidizing fluid (oxidant) which results from the position of the inlet port 24 and of the outlet port 26 is indicated by arrows pointing to the right. The oxidant and reduction agent in this example flow in opposite directions past the membrane electrode assembly 16.

At this point, it should be mentioned that separator plate units 44, particularly when they are in the form of bipolar plates for a stack structure, normally each have an anode plate and a cathode plate, which are electrically conductively connected to one another. The electrically conductive connection can be produced, for example, with the aid of a metal foil arranged between the anode plate and the cathode plate.

A separating wall 36 is arranged within the first fluid area 12, which is in the form of a cathode area, and subdivides the fluid area 12 into a metering area 32 remote from the cathode and a fluid subarea 34 close to the cathode. The separating wall 36 is arranged inclined with respect to the membrane electrode assembly 16. The angle between the membrane electrode assembly 16 and the separating wall 36 is preferably between 5° and 80°. The thickness of the separating wall 36 for vehicle applications is preferably in the range from 0.5 to 4 mm, and its width is preferably in the range from 200 to 1000 mm. The separating wall 36 is preferably in the form of a thin metallic foil.

The metering area 32 has a plurality of metering points 38 as a fluidic connection to the adjacent fluid subarea 34 close to the cathode, such that the oxidant (first fluid) can be metered from the metering area 32 through the metering points 38 into the adjacent fluid subarea 34, which is in the form of a cathode subarea, as is indicated by small arrows from the metering area 32 into the fluid subarea 34.

Starting from an inlet port 24 at the edge for the oxidant into the fluid area 12 which is in the form of a cathode area, the cross section of the cathode area 34 close to the cathode increases in the flow direction 40 of the oxidant towards the outlet port 26, whereas the cross section of the metering area 32 decreases in the opposite sense to the fluid area 34, which is in the form of the cathode area close to the cathode.

Overall, this therefore advantageously results in the cathode area associated with the separator plate unit 44 having a uniform thickness. In the situation in which the separator plate unit 44 does not have a uniform thickness, it is advantageous to arrange two identical separator plate units 44 in a stack such that this results in a uniform thickness overall for the arrangement.

The fluid area 12 is filled with a porous metallic material 46 which replaces the conventional gas distribution channels. The cross section of the fluid subarea 34 close to the cathode is preferably dependent on the oxygen requirement of the membrane electrode assembly 16 and/or is dependent on the desired relative humidity of the oxidant in the cathode-side fluid area 34, which is in the form of the cathode subarea. The metering area 32 is also filled with the porous material 46. The metering area 32 and the fluid subarea 34 close to the cathode are in the form of wedges and are arranged in opposite senses to one another.

The second fluid area 14, which is in the form of an anode area, is not subdivided by a separating wall but is advantageously likewise filled with a porous material 46.

Figure 2:
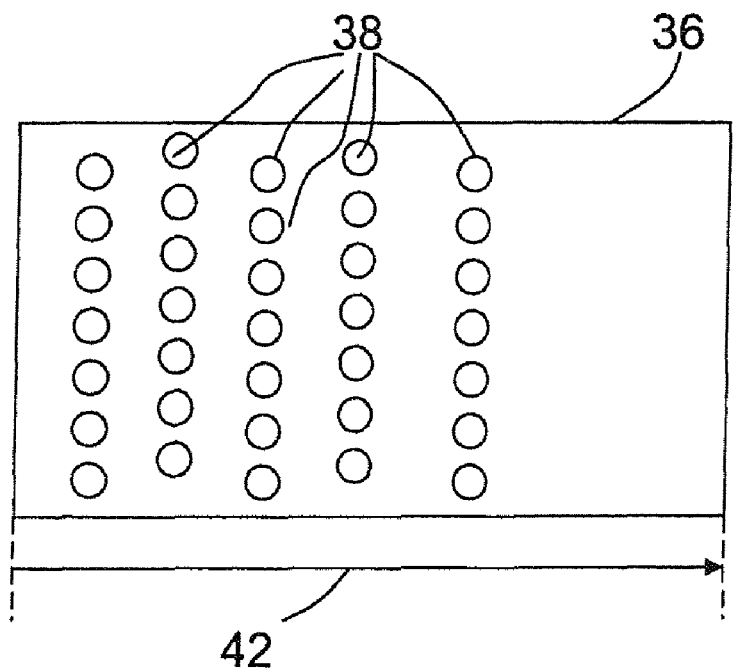
FIG. 2 shows a preferred separator.

Along its longitudinal extent 42 starting from the inlet port 24 for the oxidant, the separating wall 36 has a plurality of metering points 38 in the form of holes, as can be seen on the basis of a plan view of a preferred separating wall 36, in FIG. 2. A plurality of parallel rows of metering points 38 are arranged along the longitudinal extent 42 of the separating wall, with the rows being formed at right angles to the longitudinal extent 42.

In this example, the metering points 38 start close to the inlet and are arranged over about 75% of the longitudinal extent 42. No metering points 38 are provided at the opposite end to the inlet port 24.

Figure 3:
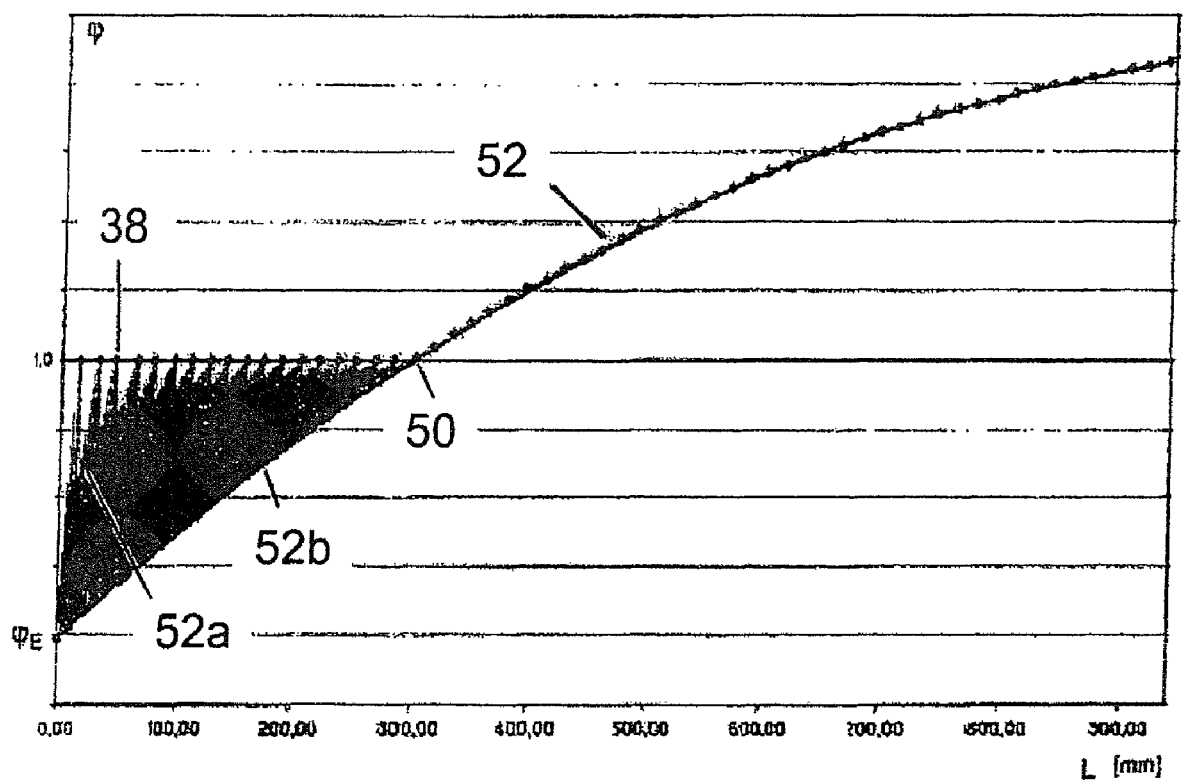
FIG. 3 shows a profile of a relative humidity of an oxidant in its flow direction in a fuel cell according to the invention.

FIG. 3 shows the profile of the relative humidity $\phi$ (52, 52a, 52b) along a longitudinal extent L of a fluid area 12 in the form of a cathode area in one preferred embodiment of the fuel cell 10 according to the invention.

In the illustrated case, the metering area 32 is designed such that saturation is reached with φ=1, but is not exceeded, at the metering points 38, only one of which, annotated 38, is illustrated in a representative form, for the sake of clarity. For comparison, two branches 52a, 52b of the profile of the relative humidity φ in this area are illustrated below the saturation point 50: the upper branch 52a has a sawtooth-like profile and merges into the profile 52 at the saturation point 50. Together, the profiles 52a and 52 form the profile of the relative humidity φ (52, 52a) in a fuel cell 10 according to the invention.

The lower branch 52b, shows, for comparison with this, the profile of the relative humidity φ in this area in a conventional fuel cell. The lower branch 52b likewise merges into the profile 52 at the saturation point 50. The profiles 52b and 52 together form the profile of the relative humidity φ (52, 52b) in a conventional fuel cell.

The sawtooth-like profile of the upper branch 52a of the relative humidity φ (52, 52a) in the fuel cell 10 according to the invention is explained as follows: the unmoisturized oxidant, for example ambient air, enters the metering area 32 at the inlet port 24 with the inlet humidity $φ_E$ at L=0 mm. However, according to the invention the entire volume of the oxidant that is required for the fuel cell reaction does not enter there but only a small portion of it. The relative humidity φ of the oxidant increases sharply in the flow direction 40 because of the product water which is created in the fuel cell reaction. The rise is particularly sharp in comparison to conventional fuel cells because the amount of metered oxidant is less than in the case of conventional fuel cells, but approximately the same amount of product water is created, so that the ratio of the partial pressures of water vapor to oxidant in the fuel cell 10 according to the invention is higher than in the case of conventional fuel cells. The relative humidity φ then decreases abruptly at the first metering point 38 in the flow direction 40, or at the first row of metering points 38, because relatively dry oxidant is added, which once again shifts the ratio of the partial pressures in favor of the oxidant. The relative humidity φ rises sharply from the start again after this in the flow direction 40, until the oxidant is once again added at the next row of metering points 38, etc., until the end of the metering points 38 of the metering area 32 is reached, for example where the saturation point 50 is reached.

This makes it possible to increase the relative humidity φ in the area of the inlet of the oxidant into the fluid area 12, which is in the form of a cathode area, of a fuel cell 10 according to the invention in comparison to a conventional fuel cell, such that the risk of the polymer membrane 18 drying out in this area is reduced or even prevented. On the other hand, the metering area 32 in the fuel cell 10 according to the invention is designed such that the relative humidity φ does not exceed saturation, that is to say φ=1, anywhere. This can ensure that no liquid water is created in the region of the metering area 32, which is provided with metering points 38, which liquid water could, in poor circumstances, block the metering points 38. Overall, the relative humidity φ in the area of the inlet port 24 of the oxidant into the fluid area 12, which is in the form of a cathode area, of a fuel cell 10 according to the invention can thus be increased in comparison to a conventional fuel cell, but without any risk of droplet formation and blockage of the metering points 38.

The invention claimed is:

1. A fuel cell having a membrane electrode assembly (16) which is arranged between two separator plate units (44), the separator plate units having a first fluid area (12) for distribution of a first fluid, which is adjacent to a first side of the membrane electrode assembly (16), and having a second fluid area (14) for distribution of a second fluid, which is adjacent to a second side of the membrane electrode assembly (16) opposite the first side, wherein a separating wall (36) is arranged in at least one of said first and second fluid areas (12, 14) and subdivides the fluid area (12, 14) into at least one metering area (32) and one adjacent fluid subarea (34), wherein the at least one metering area (32) has a fluid connection to the adjacent fluid subarea (34) at least one metering point (38), such that the first fluid can be metered from the metering area (32) through the metering point (38) into the adjacent fluid subarea (34), said first and second fluid areas (12, 14) each having an edge inlet port (24) and an outlet port (26), wherein, starting from an edge inlet port (24) of the fluid into the fluid area (12), a cross section of the fluid subarea (34) increases in the flow direction (40) of the first fluid towards an outlet port (26), and wherein the metering area (32) is filled with a porous material (46).

2. The fuel cell as claimed in claim 1, wherein a cross section of the metering area (32) decreases in the flow direction (40) of the first fluid.

3. The fuel cell as claimed in claim 1, wherein the cross sections of the fluid subarea (34) and metering area (32) result overall in a separator plate unit (44) with a uniform thickness.

4. The fuel cell as claimed in claim 1, wherein the cross section of the fluid subarea (34) is adjusted on the cathode side to provide sufficient oxygen for the fuel cell reaction of the membrane electrode assembly (16) and/or to create a high relative humidity of the fluid in the fluid subarea (34).

5. The fuel cell as claimed in claim 1, wherein the separating wall (36) has a plurality of metering points (38) along its longitudinal extent (42) starting from the inlet port (24) of the first fluid.

6. The fuel cell as claimed in claim 1, wherein the separating wall (36) is metallic.

7. The fuel cell as claimed in claim 1, wherein the fluid subarea (34) is filled with a porous material (46) for gas distribution.

8. The fuel cell as claimed in claim 7, wherein the porous material (46) is metallic.

9. The fuel cell as claimed in claim 1, wherein the fluid area (12) is provided as a cathode area.

10. A separator plate unit of a fuel cell (10) having a cathode area and/or an anode area as a first and a second fluid area (12, 14) for distribution of a first and a second fluid, which are adjacent to a membrane electrode assembly (16), wherein a separating wall (36) is arranged in at least one of the fluid areas (12, 14) and subdivides the at least one fluid area (12, 14) into at least one metering area (32) and one adjacent fluid subarea (34), and wherein the at least one metering area (32) has a fluidic connection to the adjacent fluid subarea (34) at least one metering point (38), such that a first fluid can be metered from the metering area (32) through the metering point (38) into the adjacent fluid subarea (34), wherein, starting from an edge inlet port (24) of the first fluid into the fluid area (12), a cross section of the fluid subarea (34) increases in the flow direction (40) of the first fluid towards an outlet port (26), and wherein the metering area (32) is filled with a porous electrically conductive material (46).

11. The separator plate unit as claimed in claim 10, wherein a cross section of the metering area (32) decreases in the flow direction (40) of the first fluid.

12. The separator plate unit as claimed in claim 10, wherein the fluid subarea (34) is filled with a porous electrically conductive material (46).

13. The separator plate unit as claimed in claim 10, wherein the fluid area (12) is a cathode area.

* * * * *